(12) United States Patent  (10) Patent No.: US 8,893,602 B2
Fung  (45) Date of Patent: Nov. 25, 2014

(54) MANDOLINE SLICER

(75) Inventor: Kam Fai Fung, Hong Kong (CN)

(73) Assignee: Conair Corporation, Stamford, CT (US)

( * ) Notice: Subject to any disclaimer, the term of this patent is extended or adjusted under 35 U.S.C. 154(b) by 795 days.

(21) Appl. No.: 13/042,050

(22) Filed: Mar. 7, 2011

(65) Prior Publication Data

US 2012/0227564 A1    Sep. 13, 2012

(51) Int. Cl.
*B26D 1/02* (2006.01)
*B27B 29/08* (2006.01)
*A47J 43/25* (2006.01)
*B26D 3/28* (2006.01)

(52) U.S. Cl.
CPC ............... *A47J 43/25* (2013.01); *B26D 3/283* (2013.01); *Y10S 83/932* (2013.01)
USPC .................. 83/856; 83/727; 83/932

(58) Field of Classification Search
CPC ........ B26D 3/18; B26D 3/283; B26D 7/2628; B26D 2003/285; B26D 2003/286; B26D 2003/288; B26D 1/25

USPC ............... 83/857, 858, 856, 435.11, 435.15, 83/717–730, 247
See application file for complete search history.

(56) References Cited

U.S. PATENT DOCUMENTS

| 4,273,013 | A | * | 6/1981 | Artin et al. ...................... 83/167 |
| 7,107,890 | B2 | | 9/2006 | Vincent |
| 7,143,677 | B2 | | 12/2006 | Zeder et al. |
| 7,621,207 | B2 | | 11/2009 | Botsai et al. |
| 2006/0283299 | A1 | * | 12/2006 | Mellen et al. ................... 83/401 |
| 2007/0125207 | A1 | | 6/2007 | Lucas et al. |

* cited by examiner

*Primary Examiner* — Kenneth E. Peterson
*Assistant Examiner* — Samuel A Davies
(74) *Attorney, Agent, or Firm* — McCormick, Paulding & Huber LLP

(57) ABSTRACT

A mandoline slicer 10 for slicing a food product, the slicer 10 comprising a frame 12 having opposed sidewalls 14,16, a first support plate 18 and a second support plate 20 positioned between the opposed sidewalls 14,16, a slicing member 22 having a slicing edge 58 positioned between the first and said second support plates 28,20, and a slice thickness adjustment mechanism 26 having a lever 80 movable between a first position and a second position and configured to vary a vertical distance between the slicing edge 58 of said slicing member 22 and an edge 42 of said first support plate 16.

4 Claims, 22 Drawing Sheets

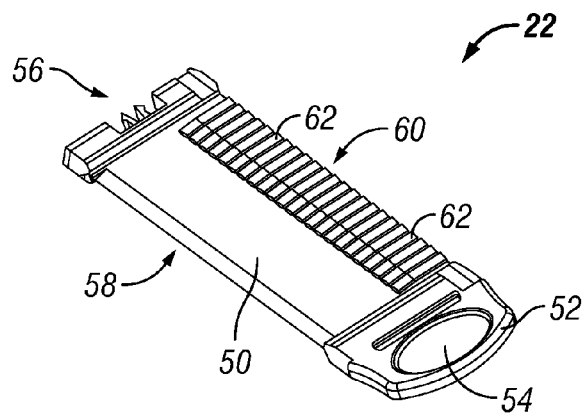
FIG. 9
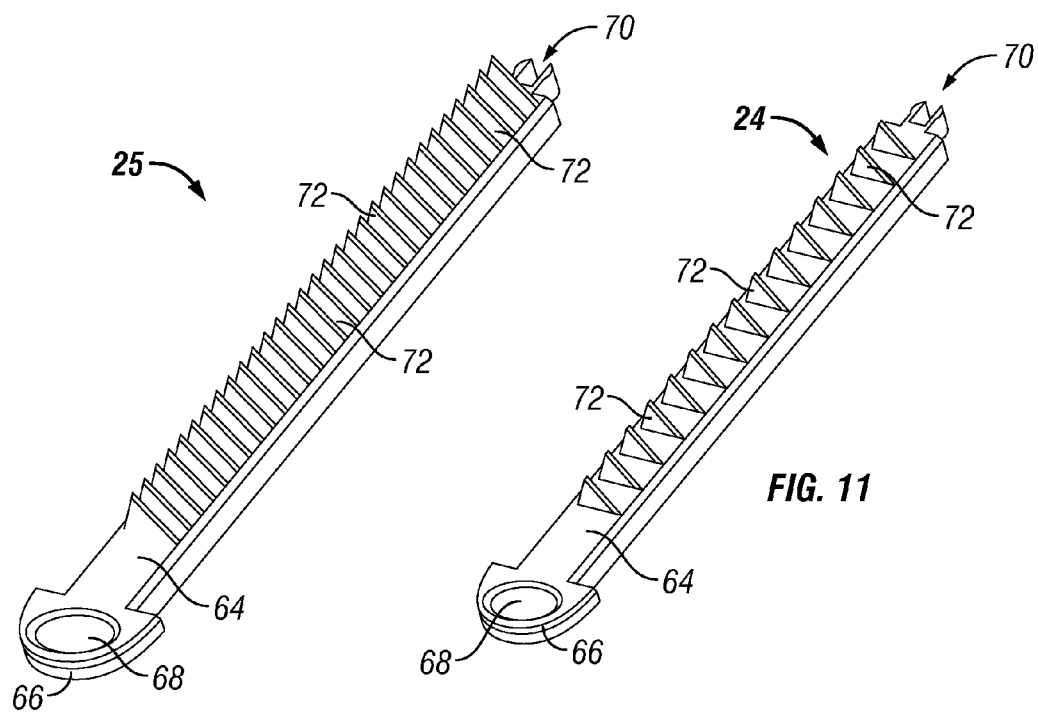
FIG. 10
FIG. 11

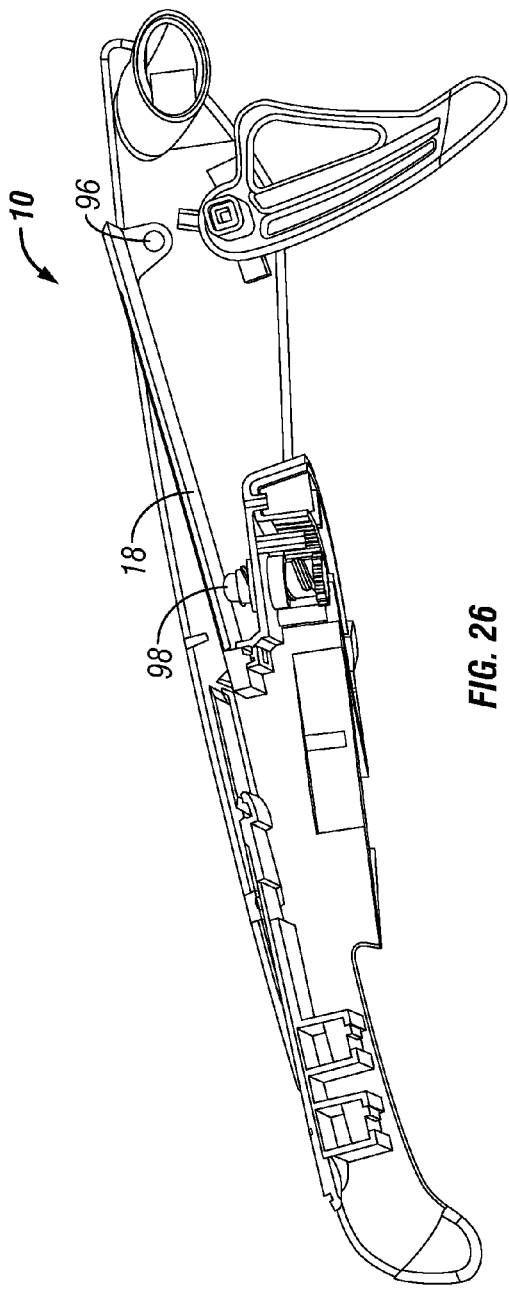
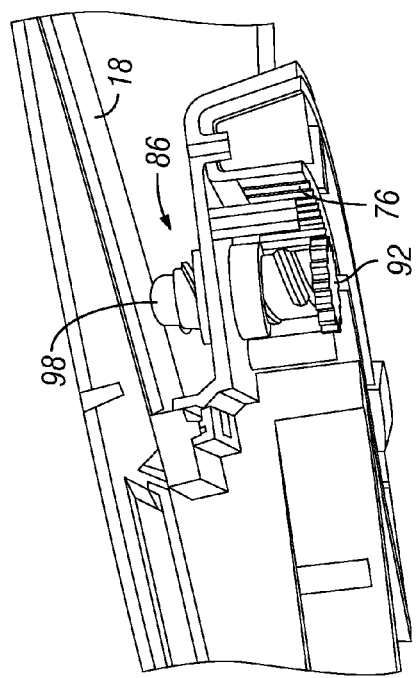
FIG. 26
FIG. 27

MANDOLINE SLICER

FIELD OF THE INVENTION

The present invention relates generally to food preparation devices and, more particularly, to a food slicer having a slice thickness adjustment mechanism and interchangeable cutting blades.

BACKGROUND OF THE INVENTION

Various designs exist for food slicing devices that include a stationary blade supported by a frame whereby a user manually slides a food product across the frame and the blade to slice the food product. While existing food slicing devices are generally suitable for what is regarded as ordinary performance, there is room for improvement in terms of safety, flexibility and customization of slice thickness and shape.

SUMMARY OF THE INVENTION

It is an object of the present invention to provide a mandoline slicer for slicing food products having a mechanism for adjusting slice thickness, a selectively actuatable protective cover, a reversible slicing blade and retractable legs.

These and other objects are achieved by the present invention.

A mandoline slicer for slicing a food product comprises a frame having opposed sidewalls, a first support plate and a second support plate positioned between the opposed sidewalls, a slicing member having a slicing edge positioned between the first and said second support plates, and a slice thickness adjustment mechanism having a lever movable between a first position and a second position and configured to vary a vertical distance between the slicing edge of said slicing member and an edge of said first support plate 16.

BRIEF DESCRIPTION OF THE DRAWINGS

The present invention will be better understood from reading the following description of non-limiting embodiments, with reference to the attached drawings, wherein below:

FIG. 9 is a perspective view of a slicing blade in accordance with one embodiment of the present invention.

FIG. 10 is a perspective view of a coarse fryer knife for use with the mandoline slicer of FIG. 1, in accordance with one embodiment of the present invention.

FIG. 11 is a perspective view of a julienne knife for use with the mandoline slicer of FIG. 1, in accordance with one embodiment of the present invention.

FIG. 26 is a perspective view of the mandoline slicer of FIG. 1 in the second, cutting position.

FIG. 27 is a detail perspective view of the mandoline slicer of FIG. 1 in the second, cutting position.

DETAILED DESCRIPTION OF THE PREFERRED EMBODIMENT

Figure 1:
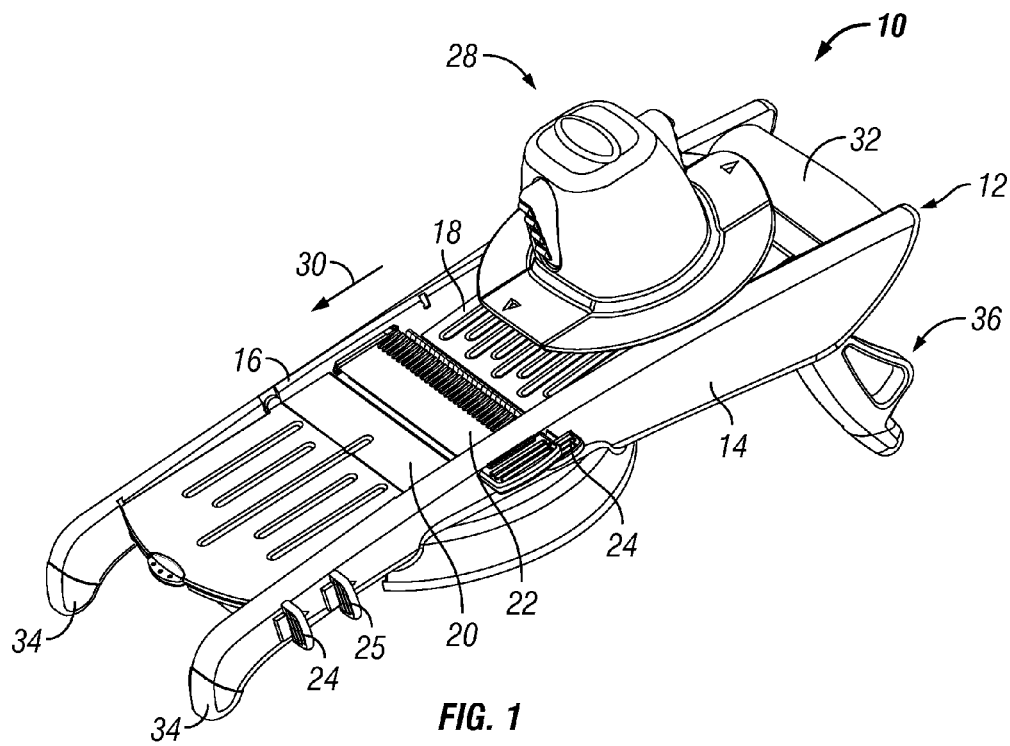
FIG. 1 is a perspective view of a mandoline slicer and associated food carriage assembly according to a first preferred embodiment of the present invention.
Figure 2:
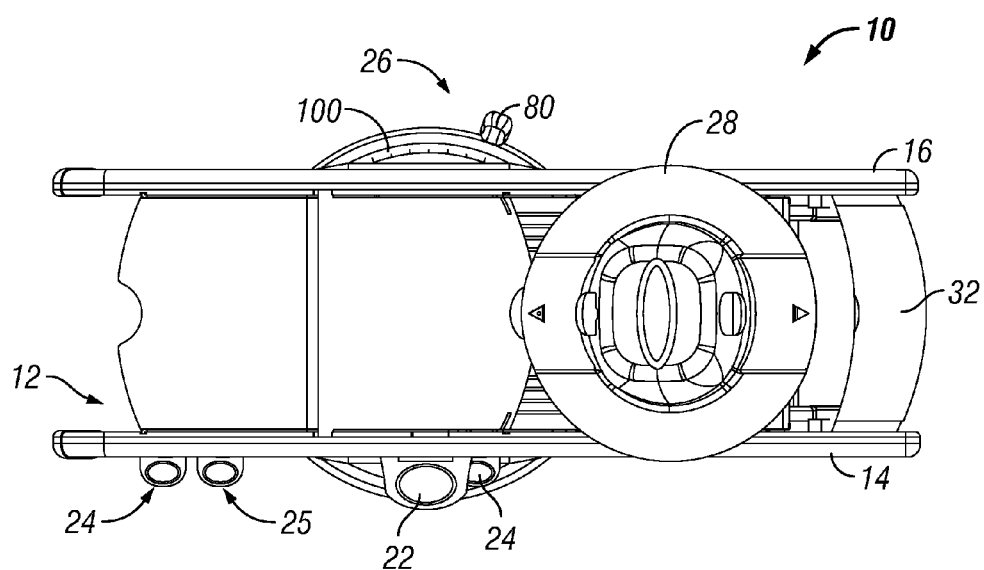
FIG. 2 is a top plan view of the mandoline slicer of FIG. 1.
Figure 3:
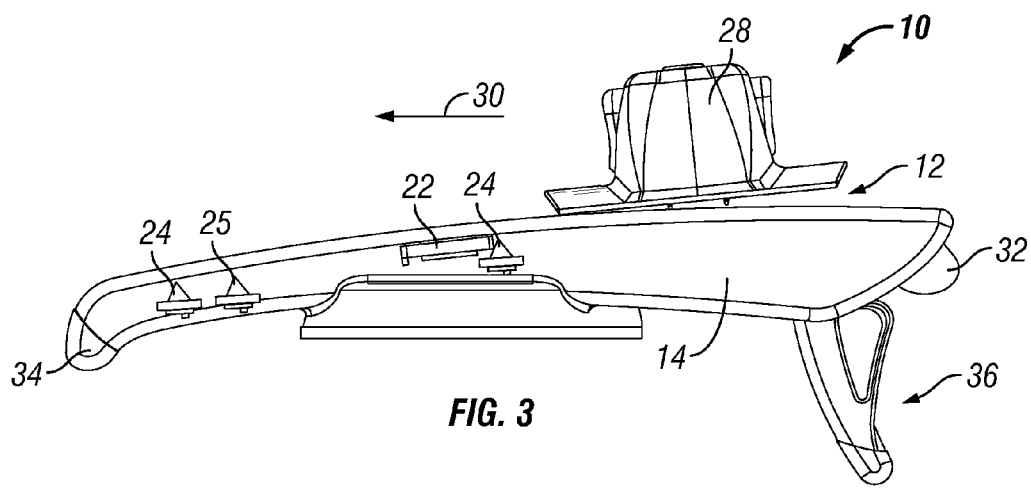
FIG. 3 is a right side elevational view of the mandoline slicer and associated food carriage assembly of FIG. 1.
Figure 4:
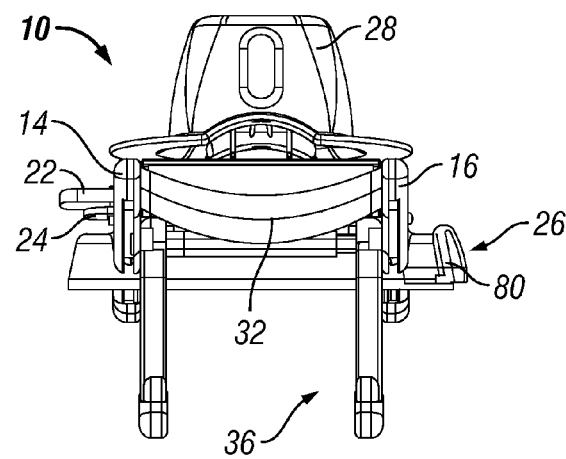
FIG. 4 is a rear elevational view of the mandoline slicer and associated food carriage assembly of FIG. 1.

Referring generally to FIGS. 1-8, a mandoline slicer 10 according to a first preferred embodiment of the present invention comprises a frame 12, generally rectangular in shape, having a pair of opposing, substantially parallel sidewalls 14,16. The slicer further includes an infeed plate 18, a discharge plate 20, a reversible slicing blade 22, a cutting knife 24, an adjustment mechanism 26 and a carriage assembly 28. The adjustment mechanism 26 may be utilized for modifying the thickness of slices resulting from the slicing operation when the food product is guided across the slicer 10 in a cutting direction 30. The carriage assembly 28 may be utilized to grip or hold the food item such that it can be easily and safely moved across the slicer 10. As best shown in FIG. 1, the cutting direction 30 is parallel to the infeed plate 18 and towards the reversible slicing blade 22. Portions of the frame 12 may be formed from any material having sufficient strength for supporting the slicing operation, as known in the art, including but not limited to, metals, plastics and combinations thereof.

As shown in FIGS. 1, 2 and 5-8, the sidewalls 14,16 are interconnected adjacent to a rear end thereof by a handle 32. Respectively integral with the sidewalls 14,16 at the front (downstream) ends thereof and extending downwardly and forwardly therefrom are feet 34. A leg assembly 36 is rotatably connected to an inner portion of the opposed sidewalls 14,16 at a rear (upstream) end thereof and may fold into a recess of the slicer 10 for more compact storage, as discussed in detail below. Formed through the sidewall 14 intermediate its ends is a long, narrow, rectangular opening 38 for receiving the reversible slicing blade 22 and a triangular opening 40 for receiving the cutting knife 24.

Figure 5:
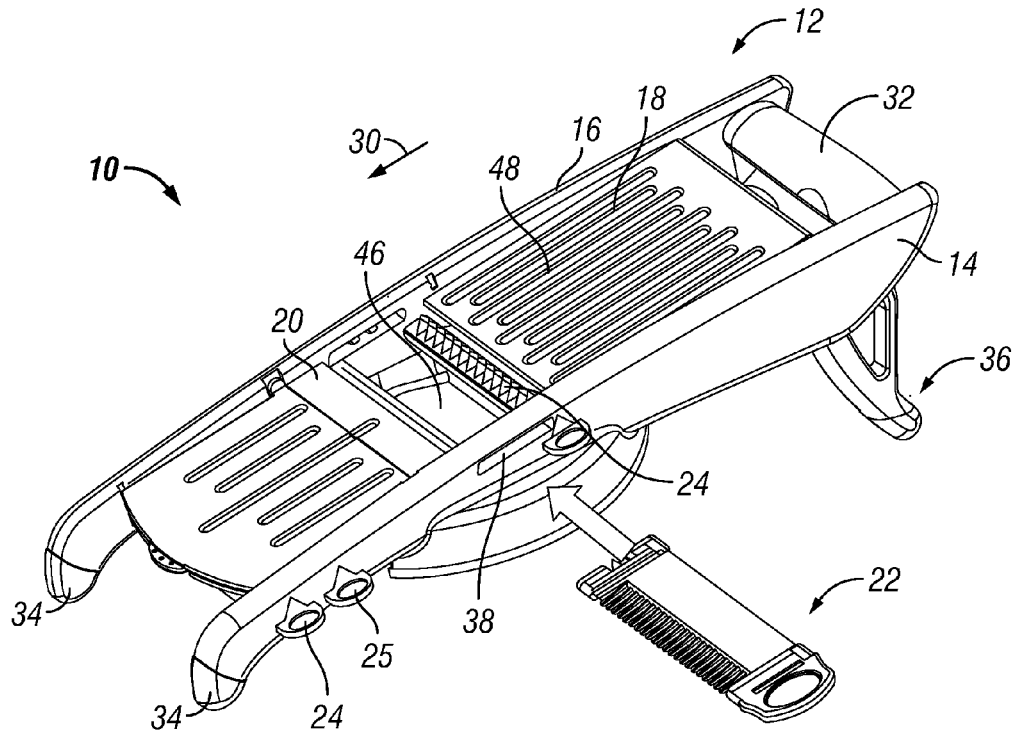
FIG. 5 is a perspective view of the mandoline slicer of FIG. 1, with a removable slicing blade removed.
Figure 6:
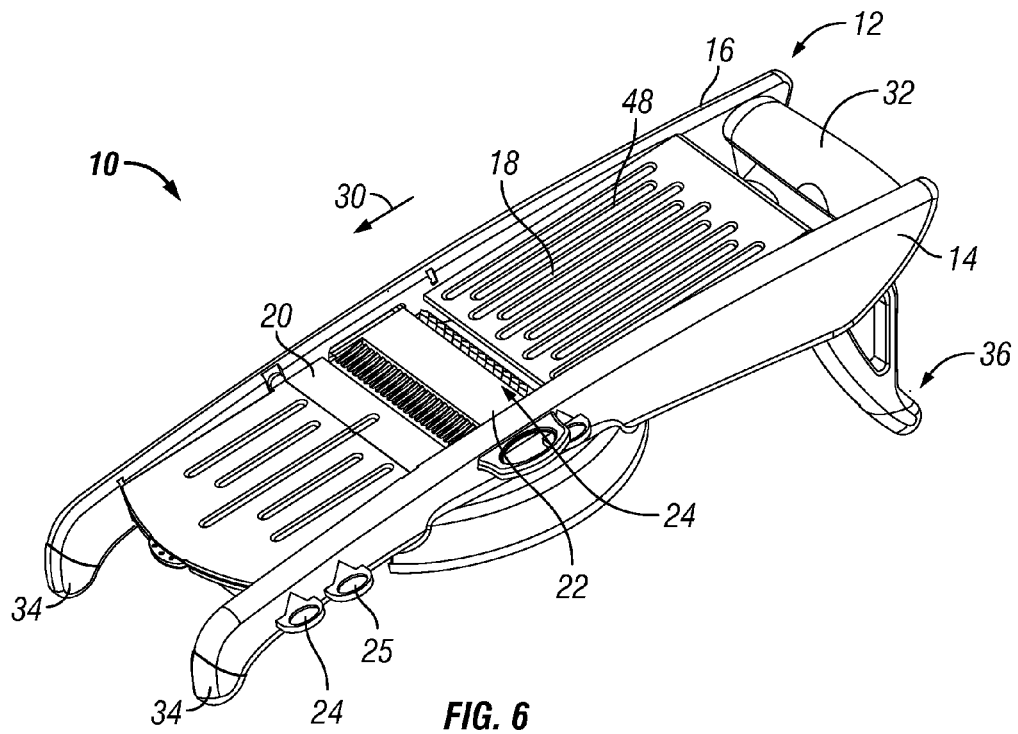
FIG. 6 is a perspective view of the mandoline slicer of FIG. 1, with a removable slicing blade in slicing position.
Figure 7:
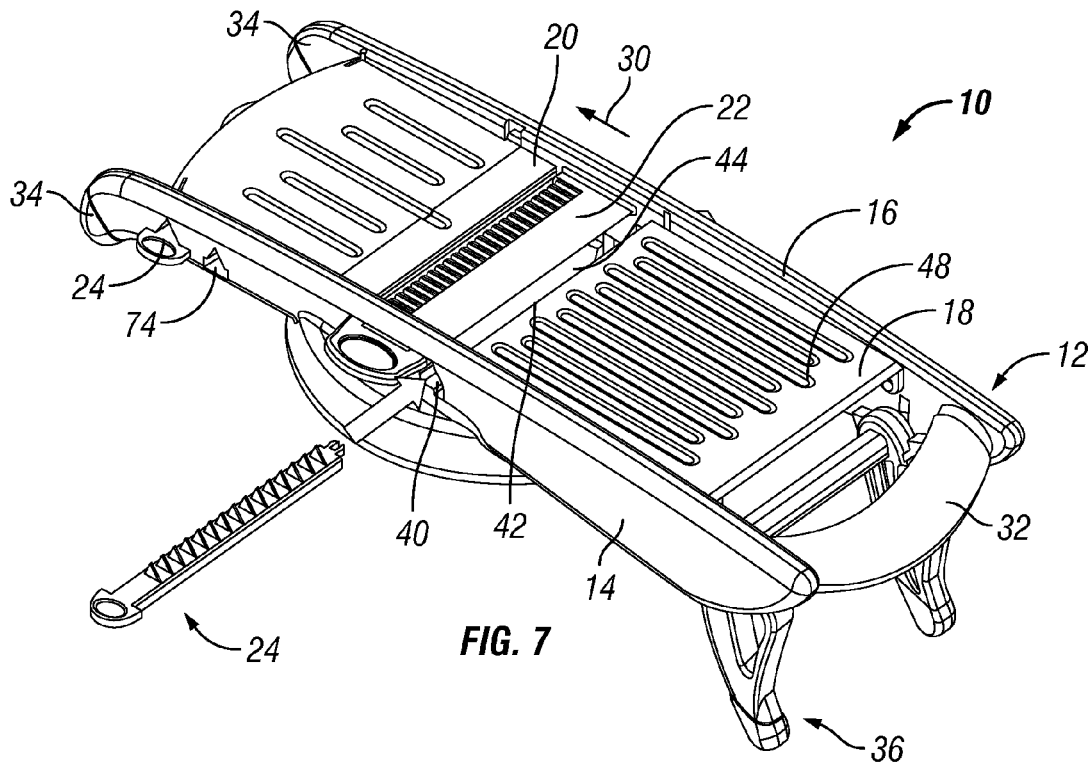
FIG. 7 is a perspective view of the mandoline slicer of FIG. 1, with a removable cutting knife removed.
Figure 8:
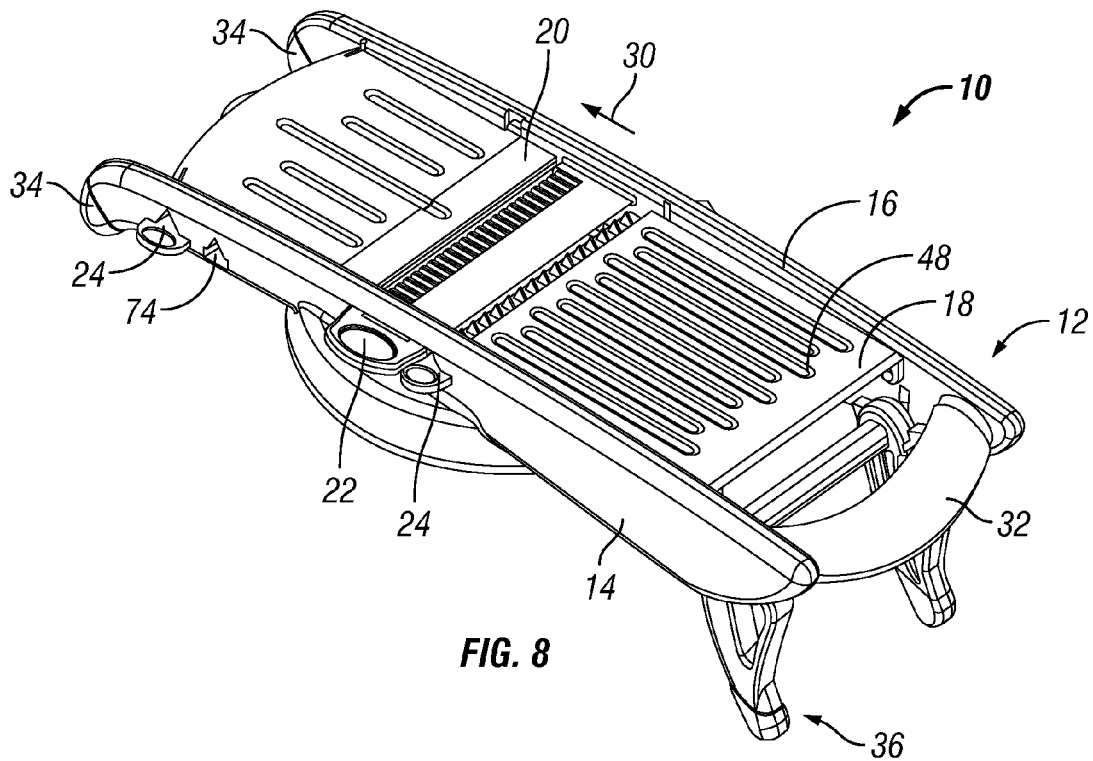
FIG. 8 is a perspective view of the mandoline slicer of FIG. 1, with a removable cutting knife in cutting position.

Referring to FIGS. 5-8, the infeed plate 18 is generally rectangular in shape, is pivotally attached to the frame 12 at an inner surface of the sidewalls 14,16 adjacent the handle 32, and is dimensioned to fit between the sidewalls 14,16 between the handle 32 and the triangular opening 40. The infeed plate has a substantially straight front edge 42 disposed substantially perpendicular to the sidewalls 14,16. Downstream of the front edge 42 of the infeed plate 18 is a generally rectangular opening 44 dimensioned to receive the cutting knife 24, as shown in FIGS. 7 and 8, and a generally rectangular opening 46 for receiving the slicing blade 22, as shown in FIGS. 5 and 6. The discharge plate 20 is also rectangular in shape and occupies the space between the sidewalls 14,16 at the forward, downstream end thereof, being fixedly secured thereto by suitable means such as with pins or other means known in the art, or by being integrally formed therewith. One or both of the infeed plate 18 and the discharge plate 20 may be provided with longitudinally extending and laterally spaced apart ribs 48.

Referring to FIG. 9, the reversible slicing blade 22 has an elongated, rectangular generally flat body 50 and is provided at one end thereof with a handle 52. The handle 52 includes a depression 54 formed thereon to facilitate gripping during insertion or removal. The other end of the blade 22 is provided with a two-pronged hook 56 for securing the blade, as discussed below. The body is preferably formed of metal and defines a first longitudinally extending blade edge 58 along one side thereof and a second blade edge 60 along an opposite side thereof, the second blade edge 60 including a plurality of flutes or serrations 62. The blade 22 is dimensioned to be received in the rectangular opening 38, as illustrated in FIGS. 5 and 6, such that hook 56 engages the sidewall 16, whereupon the hook 56 snaps into a corresponding receptacle (not shown) formed in the sidewall 16. As can be seen in FIG. 9, the blade 22 is reversible so that either the first blade edge 58 or the second blade edge 60 may be selectively presented against the cutting direction 30 for slicing a food item.

Referring to FIGS. 10 and 11, two alternative cutting knives, a coarse cutting knife 24 and a julienne knife 25 are shown. As shown therein, each cutting knife 24, 25 has a rectangular generally flat body 64 and is provided at one end thereof with a handle 66. As with the handle 56 of the slicing blade 22, the handle 66 of the cutting knives 24,25 include a depression 68 formed thereon to facilitate gripping during insertion or removal from the frame 12 of the slicer 10. The other end of the knives 24,25 is provided with a two-pronged hook 70 for securing the blade to the frame 12 in the manner discussed above. The body 64 is preferably formed of metal and has a plurality of generally triangular, vertically extending cutting blades 72 laterally spaced along a length thereof. The knives 24, 25 are dimensioned to be selectively received in the triangular opening 40, as illustrated in FIGS. 7 and 8, such that the hook 70 engages the sidewall 16, whereupon the hook 70 snaps into a corresponding receptacle (not shown) formed in the sidewall 16.

As best shown in FIGS. 7 and 8, the sidewall 14 also includes a pair of auxiliary openings 74 adjacent the forward, distal end thereof. The auxiliary openings 74 are preferably the same as opening 40 and function to securely store cutting knives 24,25 that are not utilized during the slicing operation. In use, one of the cutting knives 24,25 may be removed from its stowed position in opening 74 and inserted into opening 40, as discussed above, to effect a cutting action. Alternatively, both cutting knives 24,25 may be left in the stowed/secured position such that only a slicing of a food item is achieved.

Figure 12:
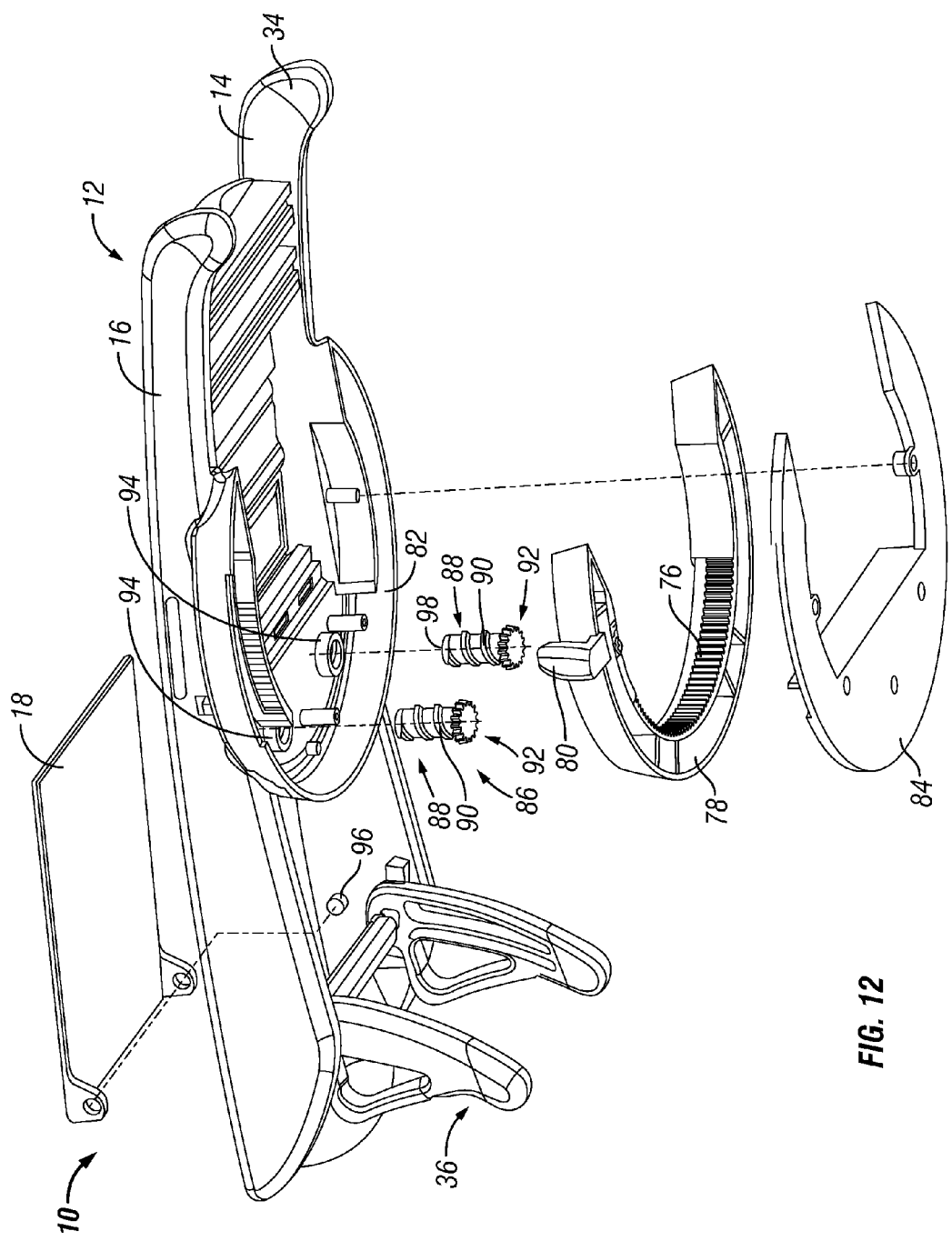
FIG. 12 is an exploded view of the mandoline slicer of FIG. 1, showing a slice-thickness adjustment mechanism in accordance with one embodiment of the present invention.
Figure 13:
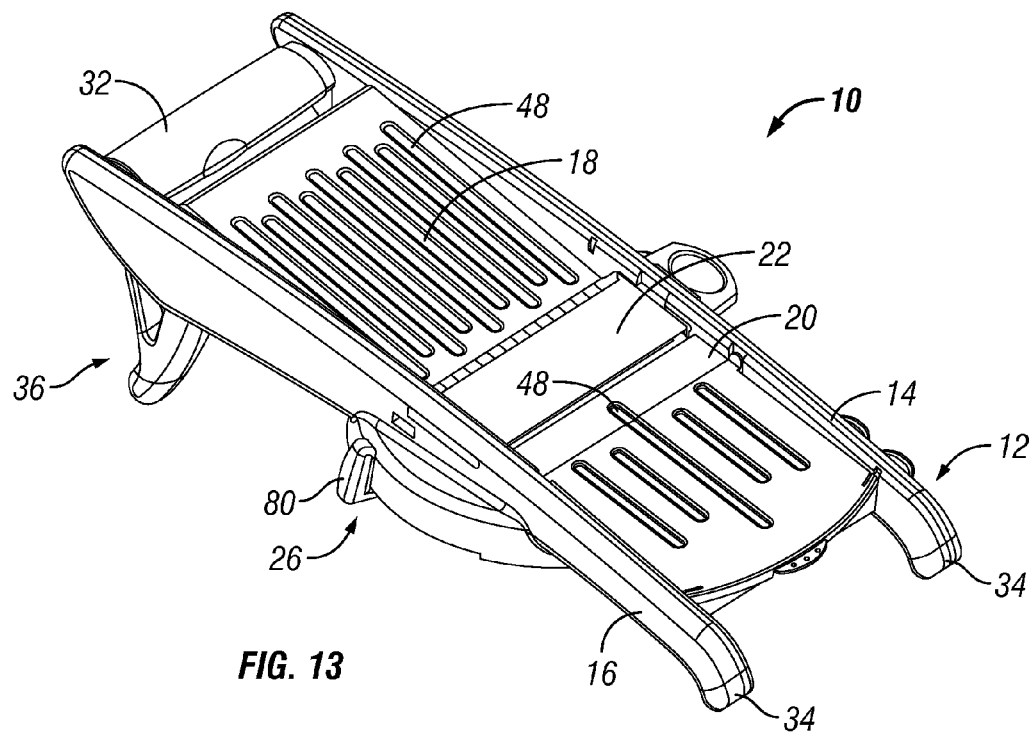
FIG. 13 is a top perspective view of the mandoline slicer of FIG. 1.
Figure 14:
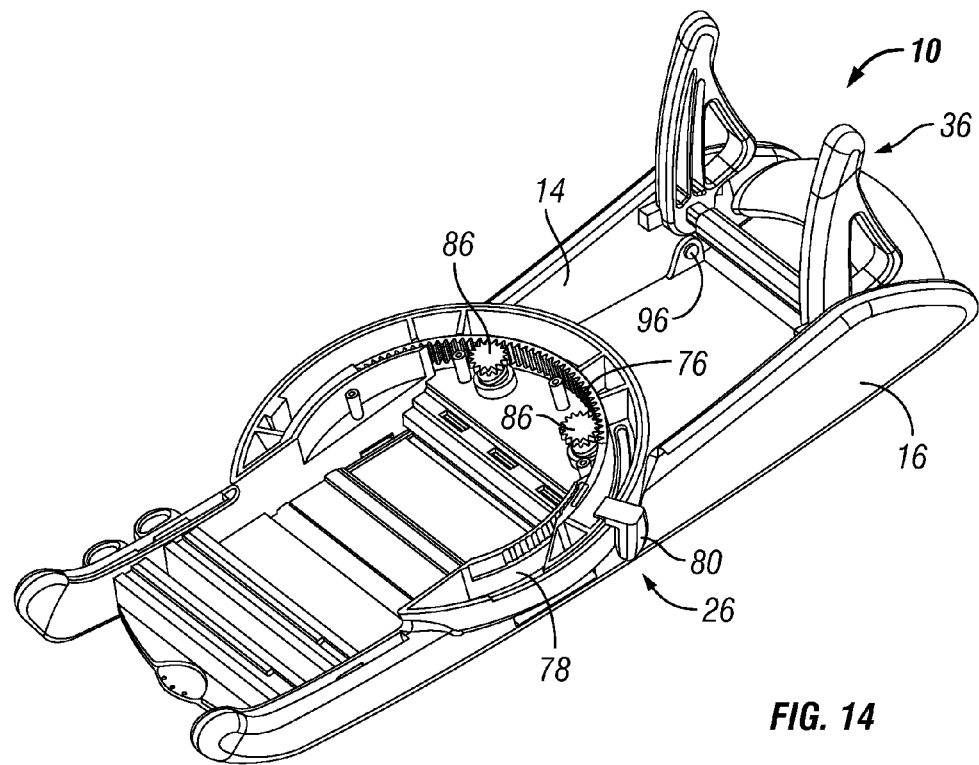
FIG. 14 is a perspective view of the slice-thickness adjustment mechanism of the mandoline slicer of FIG. 1.
Figure 15:
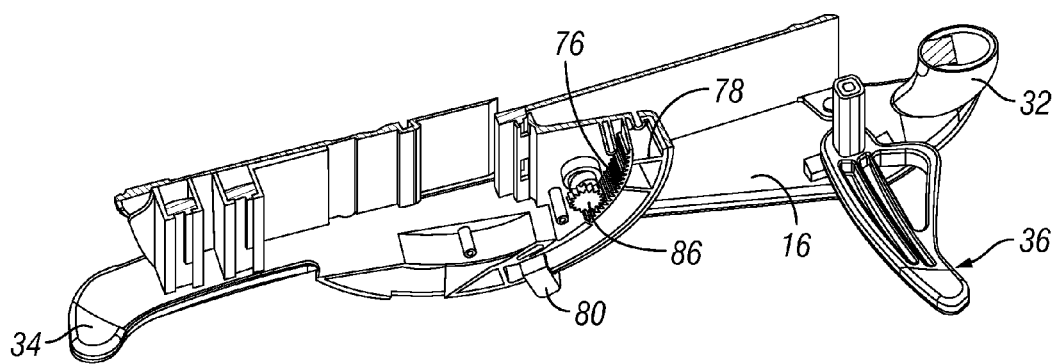
FIG. 15 is a detail perspective view of the slice thickness adjustment mechanism.

Referring to FIGS. 12-27, the adjustment mechanism 26 for selectively modifying the thickness of slices of a food item is shown. The adjustment mechanism 26 includes a semi-annular inner gear 76 slidably mounted within a correspondingly shaped slide rail 78, and a lever 80 operatively connected to (fixedly attached or integrally formed with) the inner gear 76 for slidably moving the inner gear 76 within the slide rail 78 from a first position to a second position. As best shown in FIGS. 12, 14 and 15 the inner gear 76 and slide rail 78 are received within a semi-annular-shaped recess 82 in the frame 12 and are held in position by a removable cover 84. The cover 84 is secured to the frame 12 using pins or screws, although other means known in the art may also be utilized.

The adjustment mechanism 26 further includes two screw members 86 having a body portion 88 having a helical thread 90 formed on a surface thereof, and a head portion 92 in the form of a gear integral with the body portion 88. The screw members are received in threaded throughbores 94 provided in the frame 12 on an underside of the slicer 10. Importantly, the throughbores 94 are located adjacent to the wall of the recess 82 such that when the screw members 86 are received in the throughbores 94, the geared head portion 92 of the screw member 86 meshes with the inner gear 76 so that the inner gear 76 can drive the screw members 86, as discussed in detail below. While the figures show the mandoline slicer 10 as having a pair of screw members 86, more or fewer screw members 86 may be utilized without departing from the broader aspects of the present invention.

As also shown in FIG. 12-15, a rearward portion of the infeed plate 18 is pivotally mounted about a shaft or protrusion 96 adjacent to the handle 32. The opposing, forward portion of the infeed plate 18, adjacent to the slicing blade 22 is free to move up or down, as discussed in detail below, and is limited in its downward movement by contact with distal ends 98 of the screw members 86.

Figure 16:
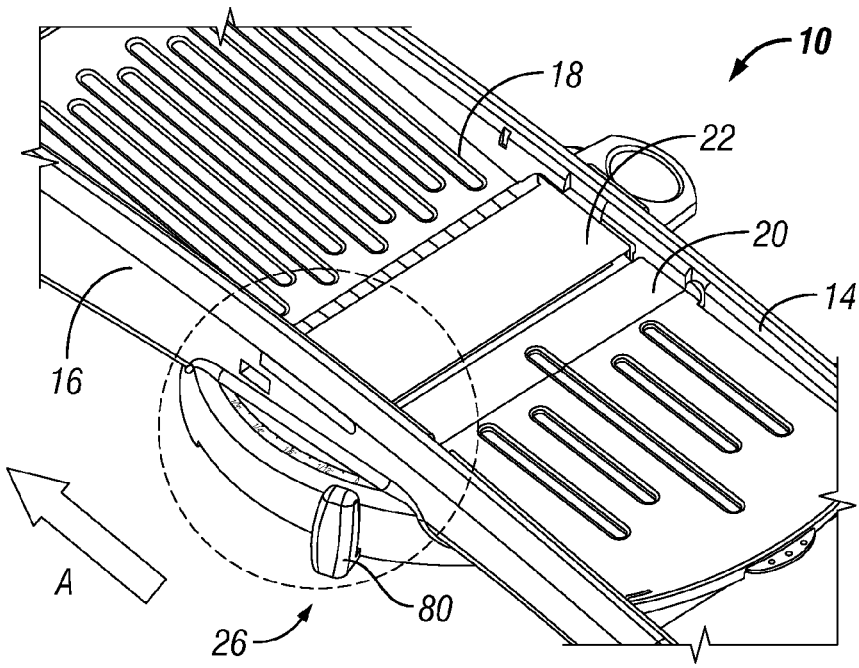
FIG. 16 is an enlarged perspective view of the mandoline slicer of FIG. 1 showing a slice-thickness adjustment lever in a first, non-cutting position.
Figure 17:
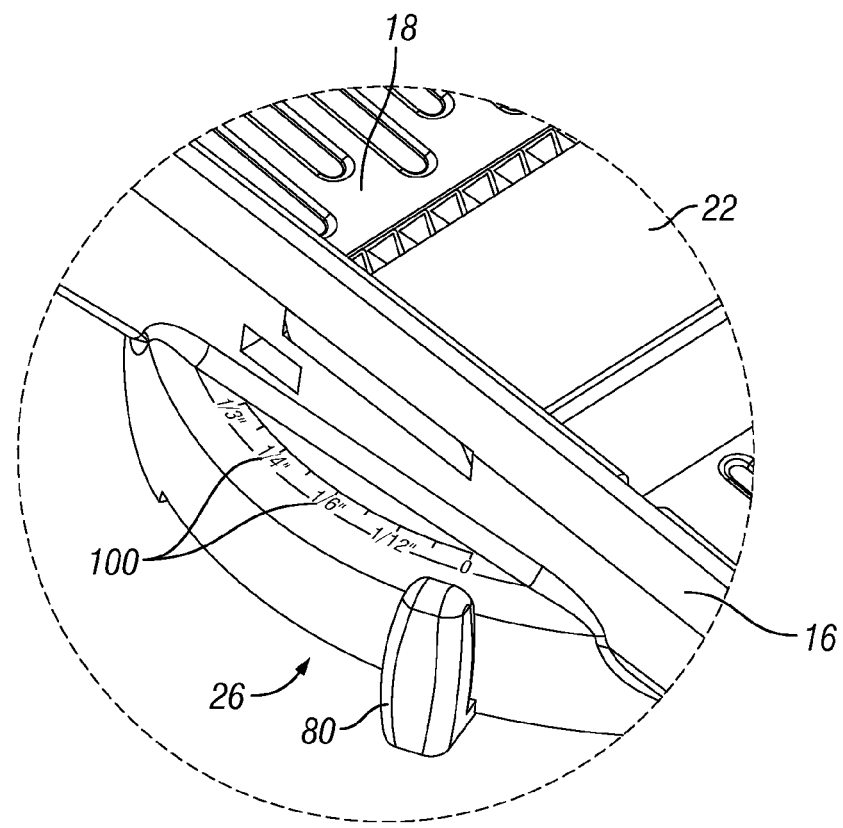
FIG. 17 is an enlarged view of the slice-thickness adjustment lever of FIG. 15 in the first, non-cutting position.
Figure 18:
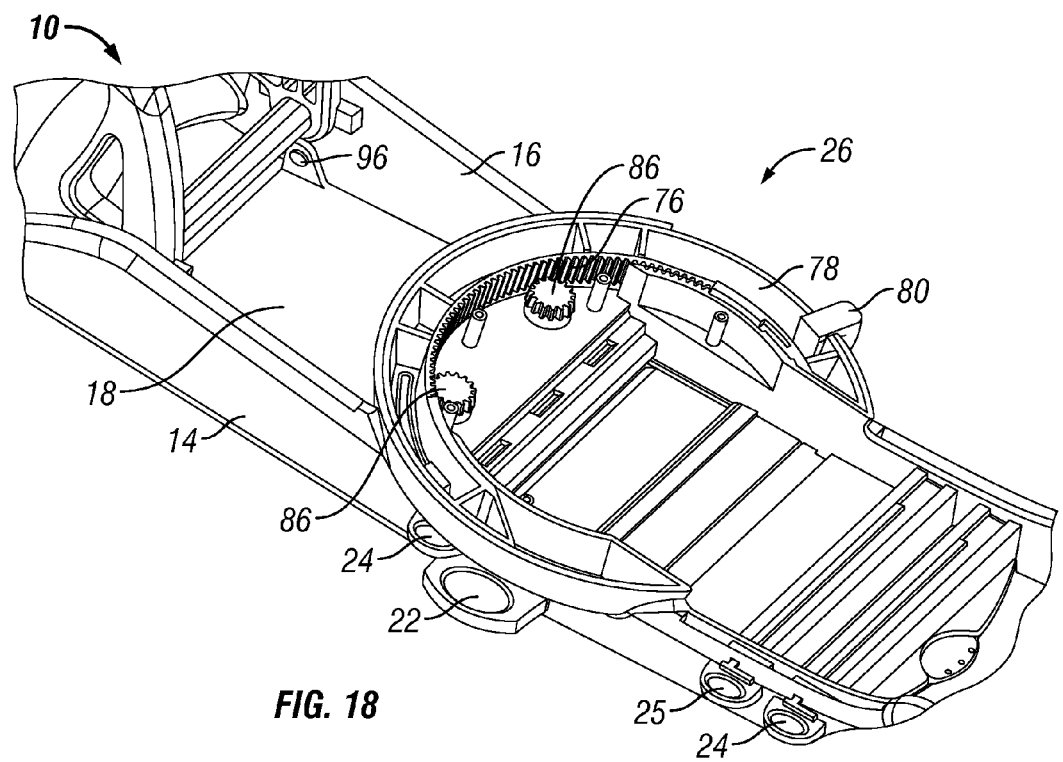
FIG. 18 is a perspective view of the slice-thickness adjustment mechanism in the first, non-cutting position.
Figure 19:
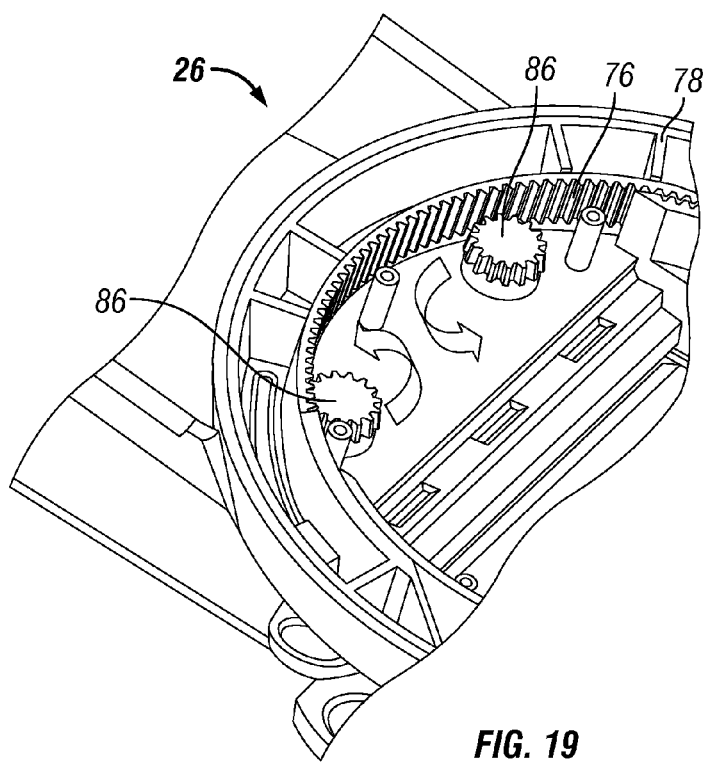
FIG. 19 is an enlarged view of the slice-thickness adjustment mechanism in the first, non-cutting position.

Referring now to FIGS. 16 and 17, a portion of the frame 12 is provided with visual increments 100 corresponding to an array of predetermined slice thicknesses. As shown therein, the lever 80 is configured for selective movement along an arcuate path in the direction of arrow A to adjust slice thickness, as hereinafter discussed.

Operation of the adjustment mechanism 26 will now be described with particular reference to FIGS. 16-27, generally. Referring first to FIGS. 16 and 17, the lever 80 is shown as being in a first position, corresponding to "0" inch thickness as denoted by the visual increments 100. In this first position, the inner gear 76 is at the position shown in FIGS. 18 and 19 and the screw members 86 are at a fully advanced position such that the gear head portion 92 of the screw members 86 meshes/engages the inner gear 76 at an inner portion thereof. As further shown in FIGS. 20 and 21, in this first, zero thickness position, the screw members 86 are fully advanced such that the distal ends 98 of the screw members 86 hold the infeed plate 18 (in particular, the forward portion of the infeed plate 18) in a position substantially coplanar with the slicing blade 22 and the discharge plate 20. As will be readily appreciated, with the infeed plate 18 being substantially aligned (coplanar) with the slicing blade 22, translation of a food item in the cutting direction 30 will not slice the item.

Figure 22:
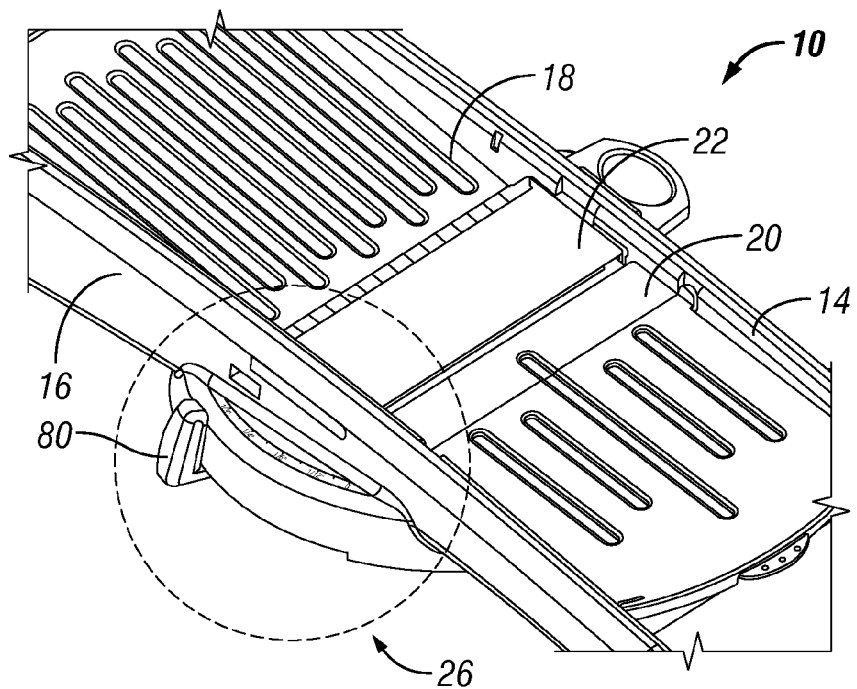
FIG. 22 is an enlarged perspective view of the mandoline slicer of FIG. 1 showing a slice-thickness adjustment lever in a second, cutting position.
Figure 23:
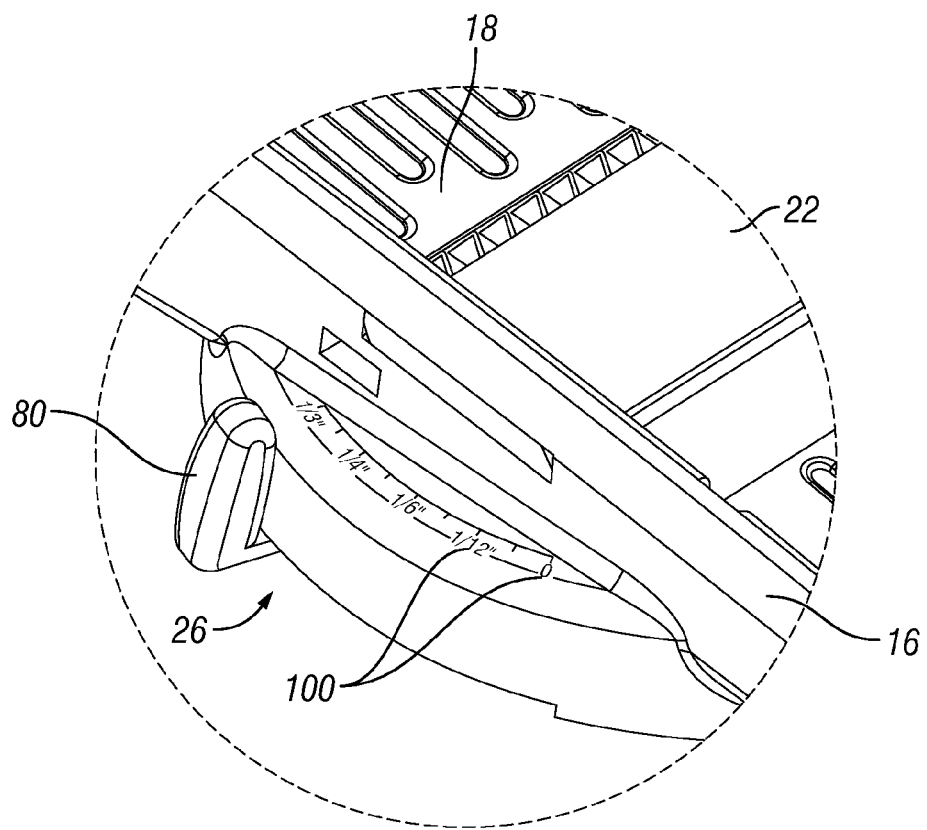
FIG. 23 is an enlarged view of the slice-thickness adjustment lever of FIG. 22 in the second, cutting position.
Figure 24:
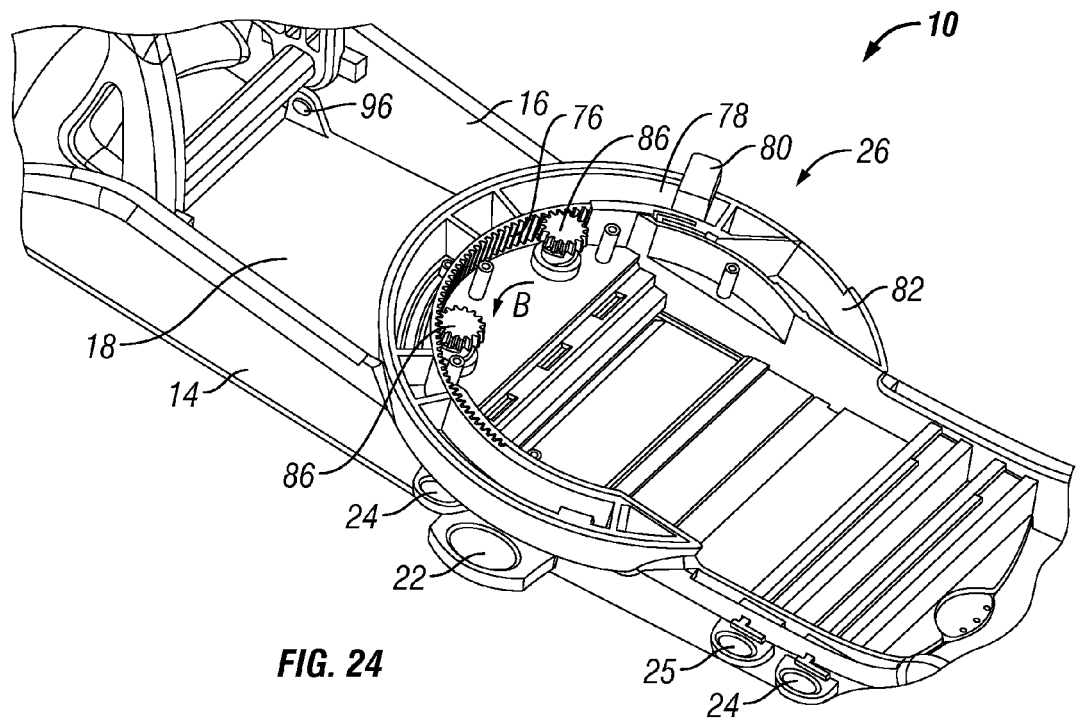
FIG. 24 is a perspective view of the slice-thickness adjustment mechanism in the second, cutting position.
Figure 25:
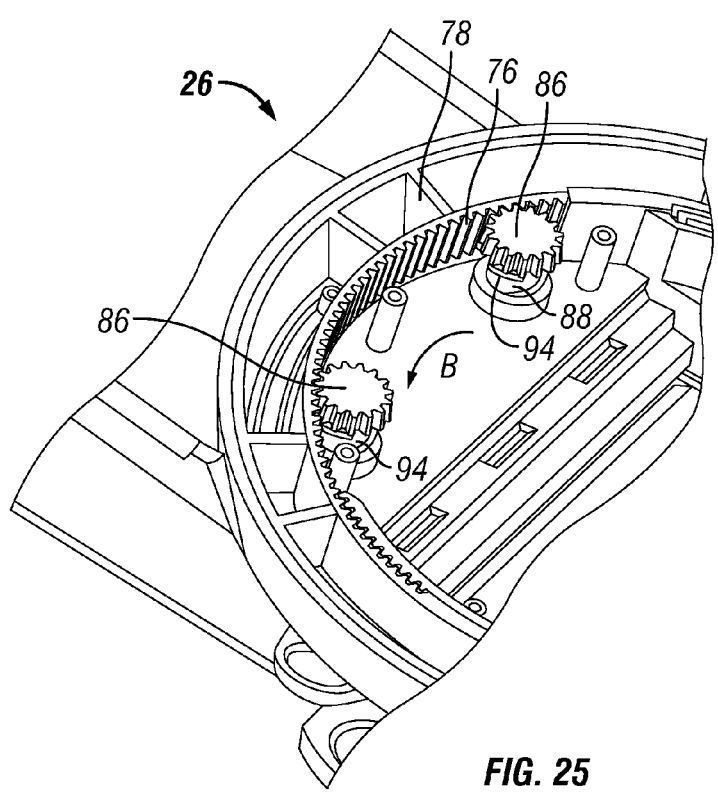
FIG. 25 is an enlarged view of the slice-thickness adjustment mechanism in the second, cutting position.
Figure 28:
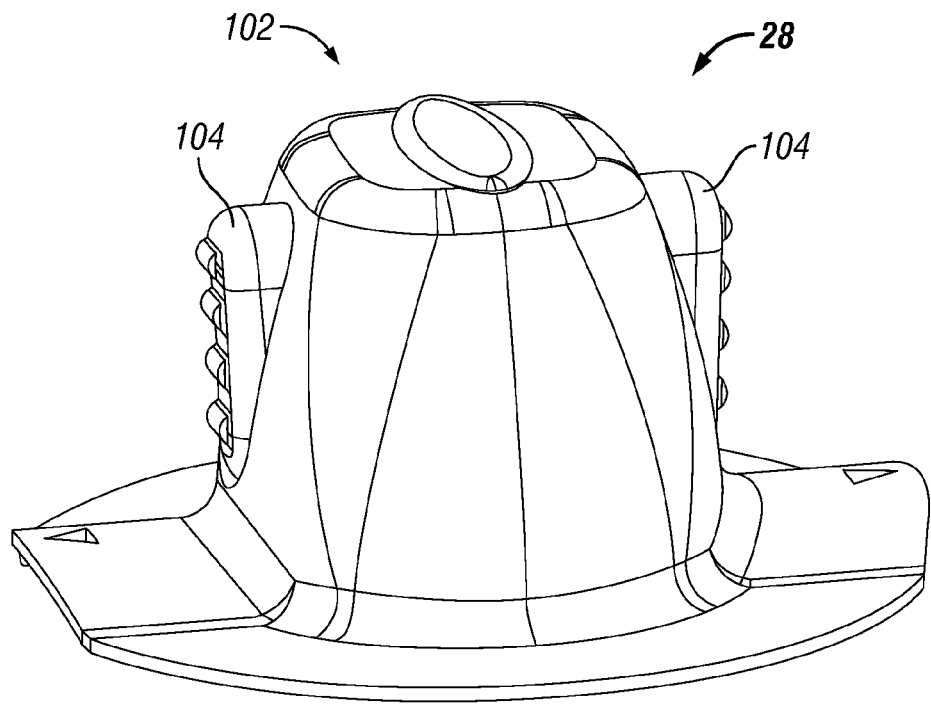
FIG. 28 is a perspective view of the food carriage assembly for use with the mandoline slicer of FIG. 1, in accordance with one embodiment of the present invention.
Figure 29:
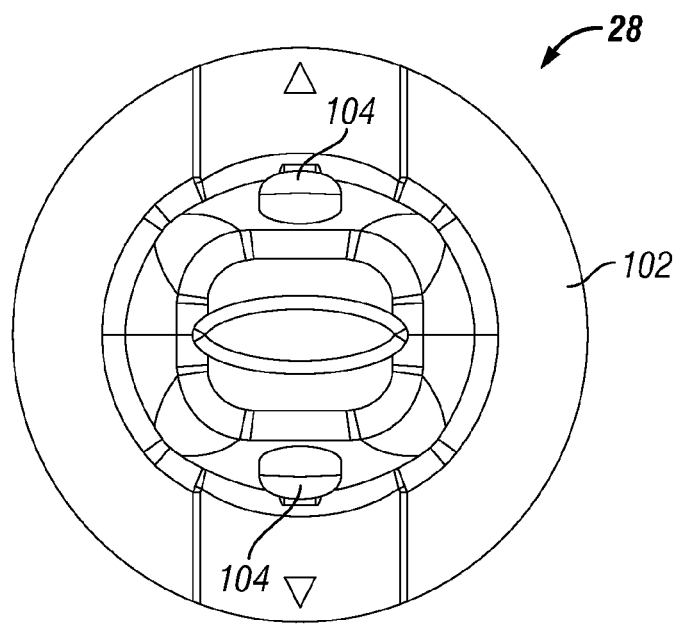
FIG. 29 is a top plan view of the food carriage assembly.
Figure 30:
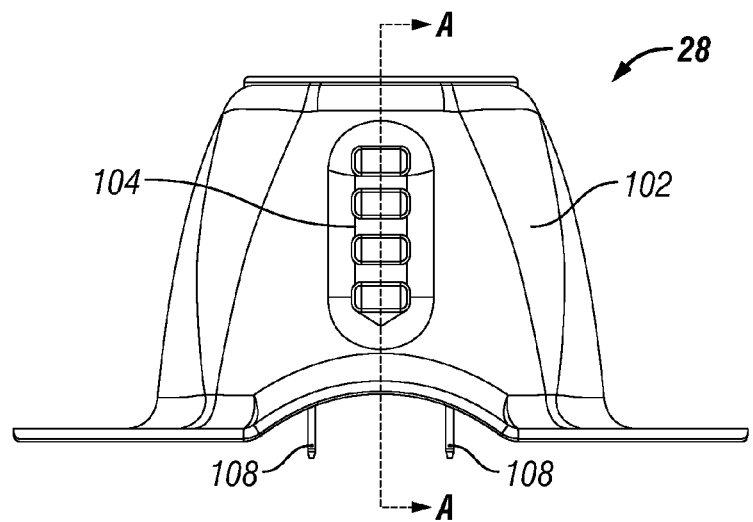
FIG. 30 is a front elevational view of the food carriage assembly of FIG. 29.
Figure 31:
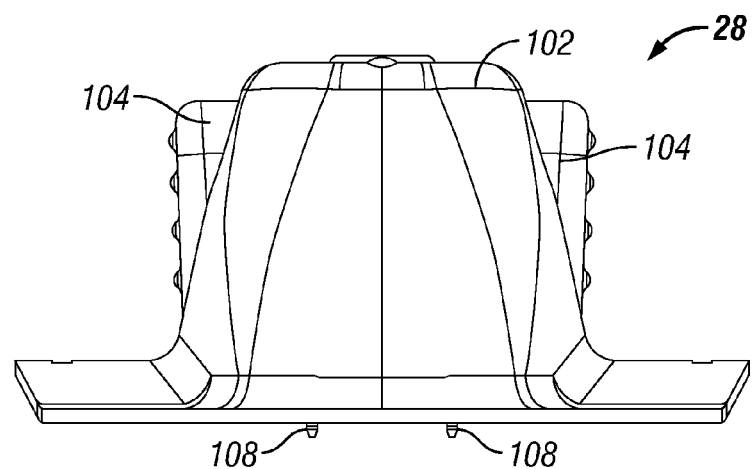
FIG. 31 is a right side elevational view of the food carriage assembly of FIG. 29.

When the lever 80 is moved in the direction of arrow A to a second position corresponding to a maximum slice thickness as denoted by the visual increments 100, as shown in FIGS. 22 and 23, the inner gear 76 is caused to move in the direction of arrow B, to the position shown in FIGS. 24 and 25. As will be readily appreciated, movement of the inner gear 76 in the direction of arrow B causes the screw members 86 to rotate counterclockwise (as viewed from the bottom of the slicer 10), i.e., in the same direction as the inner gear 76. This rotation causes the screw members 86, by way of their threaded engagement with the throughbores 94, to retract and travel up the inner gear 76 to a fully retracted position such that the gear head portion 92 of the screw members 86 meshes/engages the inner gear 76 at an outer portion thereof. As further shown in FIGS. 26 and 27, in this second, maximum thickness position, the screw members 86 are fully retracted such that the distal ends 98 of the screw members 86 hold the infeed plate 18 (in particular, the forward portion of the infeed plate 18) in a position below the edge 58 or 60, of the slicing blade 22. As show therein, in this position, the infeed plate 18 is no longer coplanar or parallel with the slicing blade.

Figure 20:
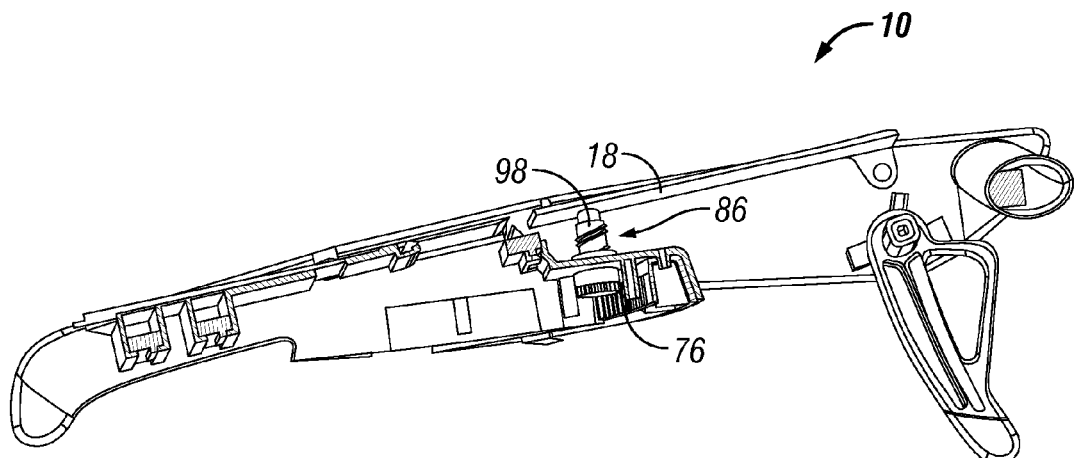
FIG. 20 is a perspective view of the mandoline slicer of FIG. 1 in the first, non-cutting position.
Figure 21:
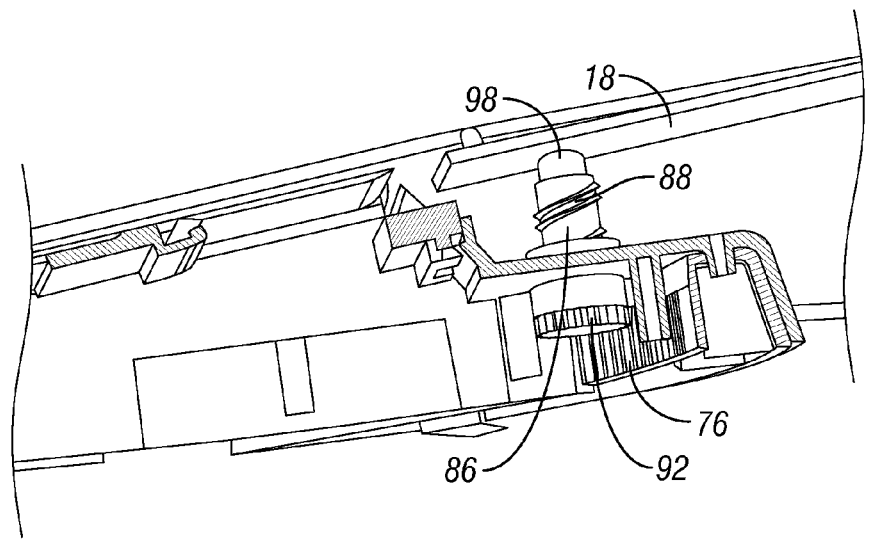
FIG. 21 is a detail perspective view of the mandoline slicer of FIG. 1 in the first, non-cutting position.

As will be readily appreciated, as the lever 80 is moved from the first position (zero thickness position) shown in FIG. 16 to the second position (maximum thickness position) shown in FIG. 22, the screw members 86 retract in the throughbores 94 from the position shown in FIGS. 20 and 21 to the position shown in FIGS. 26 and 27, causing the infeed plate 18 rotate downwardly about shaft 96 so that a clearance is provided, in the vertical direction, between the front edge 42 of the infeed plate 18 and the edge 58 or 60 of the slicing blade 22. While it has been described that the lever 80 can be positioned at the zero thickness and maximum thickness positions, it will be readily appreciated that the lever 80 may can also be selectively oriented at a position anywhere in between the zero and maximum thickness positions to produce slices of a food item having a thickness anywhere between zero thickness and maximum thickness. In the preferred embodiment, the maximum thickness is 1/3", however the slicer 10 may be modified to provide for greater slice thicknesses without departing from the broader aspects of the present invention.

In connection with the above, in order to decrease slice thickness, a user moves the lever 80 in the opposite direction described above, i.e., in the opposite direction of arrow A. This causes the inner gear 76 to rotate clockwise (when viewed from the bottom of the slicer 10) which, in turn, causes the screw members 86 to rotate in the same direction. This rotation causes the screw members 86 to advance within the threaded throughbores 94 such that the distal ends 98 of the screw members 86 exert a force on the underside of the infeed plate 18, causing it to rotate in an upwards direction about shaft 96 to decrease the vertical clearance between the front edge 42 of the infeed plate 18 and the edge 58 or 60 of the slicing blade 22.

Referring now to FIGS. 28-37, generally, the carriage assembly 28 for gripping or holding the food item such that it can be easily and safely moved across the slicer 10, is shown. As shown therein, the carriage assembly 28 includes a housing 102, a pair of pushbuttons 104 rotatably mounted about a shaft 105 in apertures on opposing sides of the housing 102 and a food press plate 106 mounted on a plurality of guide pins 108 and disposed within the housing 102.

Figure 32:
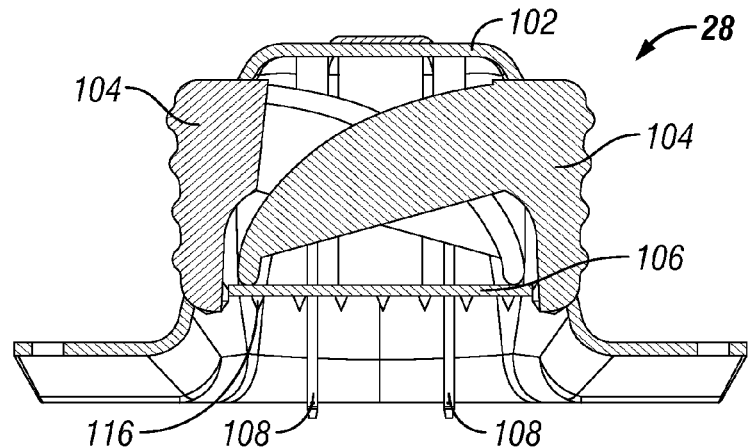
FIG. 32 is a cross-sectional view of the food carriage assembly of FIG. 29, taken along line A-A of FIG. 30.
Figure 33:
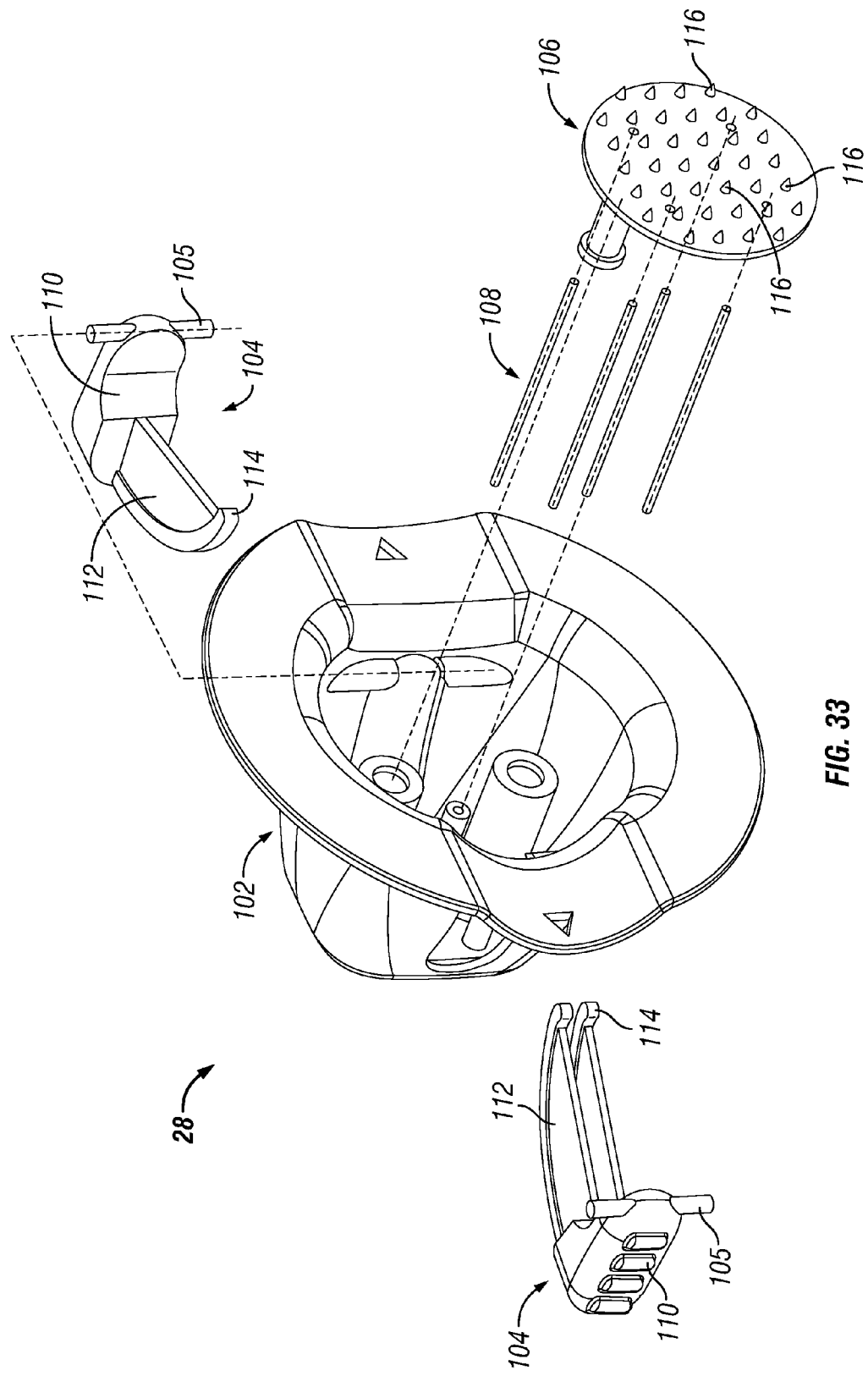
FIG. 33 is an exploded view of the food carriage assembly of FIG. 29.

As best shown in FIGS. 32 and 33, the pushbuttons 104 are generally C-shaped in cross-section and have a first portion 110, a second portion 112 integrally formed with and extending generally perpendicular from the first portion 110 and a third, contact portion 114 integrally formed with and extending generally perpendicular from the second portion 112. As further shown therein, guide pins 108 are fixedly attached to the housing 102 and are oriented substantially vertically. The press plate 106 is slidably mounted on the guide pins 108 and includes a plurality of food gripping members 116 for gripping a food item.

Figure 34:
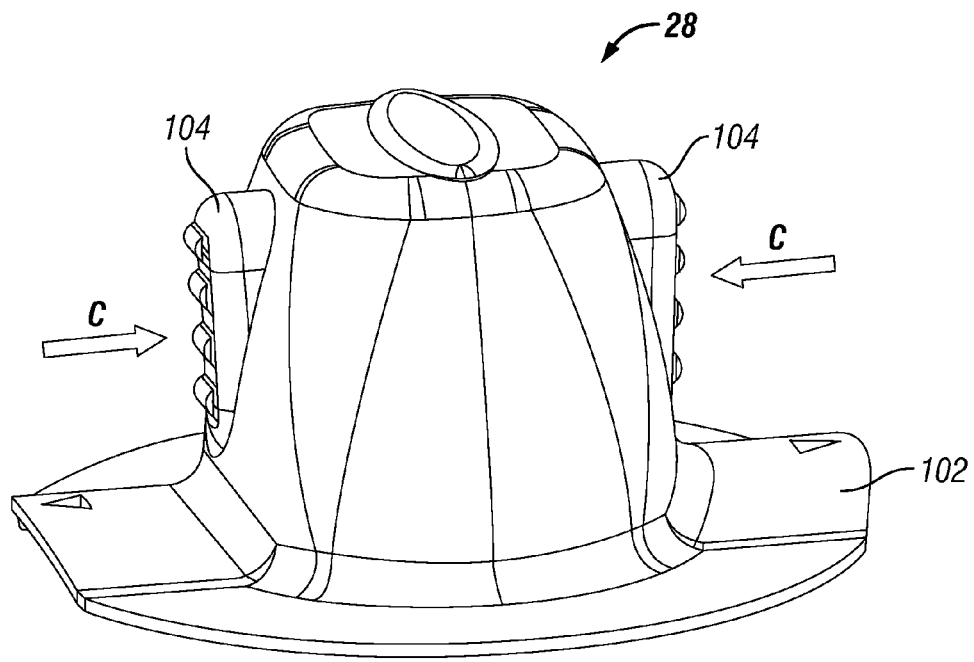
FIG. 34 is a perspective view of the food carriage assembly of FIG. 29 in a disengaged position.
Figure 35:
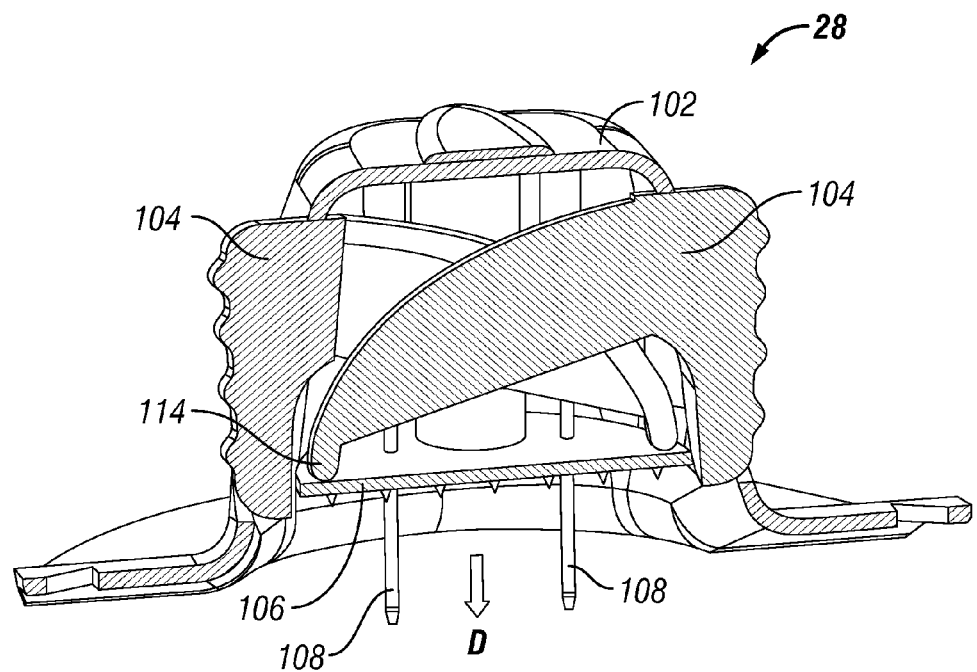
FIG. 35 is a cross-sectional view of the food carriage assembly of FIG. 29 in the disengaged position.
Figure 36:
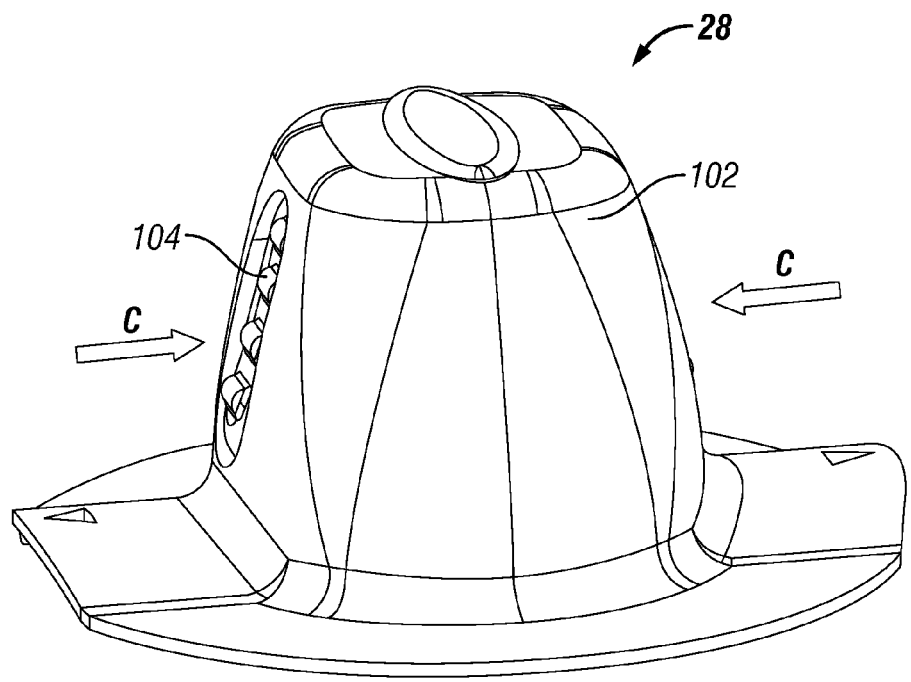
FIG. 36 is a perspective view of the food carriage assembly of FIG. 29 in an engaged position.
Figure 37:
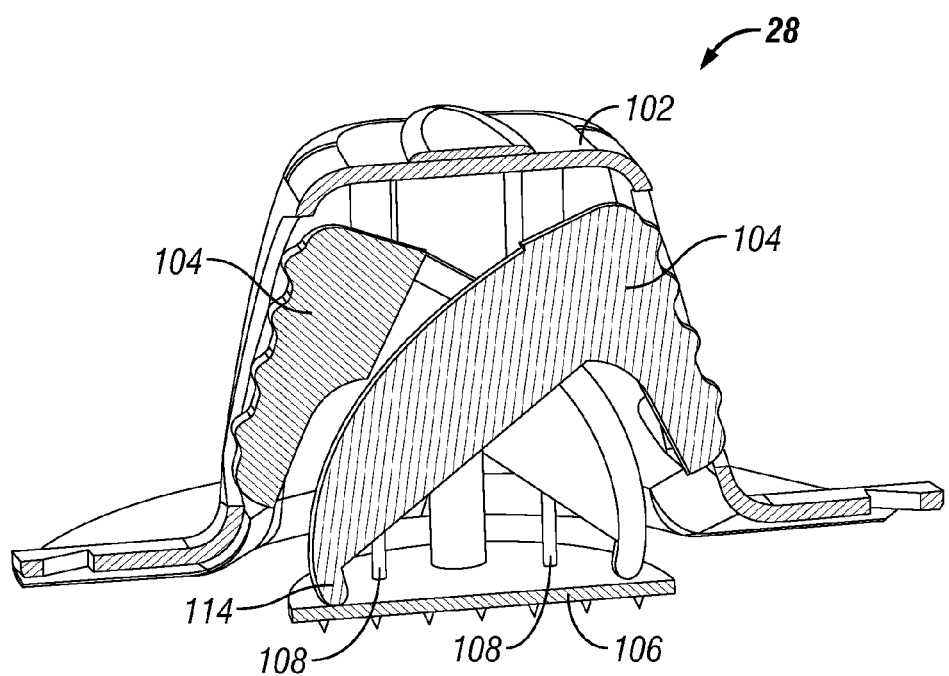
FIG. 37 is a cross-sectional view of the food carriage assembly of FIG. 29 in the engaged position.

Referring now to FIGS. 34 and 35, the carriage assembly 28 is shown in a non-gripping position. As shown therein, the press plate 106 is in a retracted position within the housing and the pushbuttons 104 are biased outwards. In operation, when the pushbuttons 104 are pushed inwards in the direction of arrow C, as shown in FIGS. 36 and 37, the third, contact portion 114 of the pushbuttons 104 exerts a generally downward force on a top side of the press plate 106. This force urges the press plate 106 to slide along the guide pins 108 in the direction of arrow D and out of the housing 102 such that the press plate 106 and gripping members 116 engage a food item. Upon releasing the pushbuttons 104, the press plate releases 106 the food item and retracts along the guide pins 108 into the housing 102.

As will be readily appreciated, known carriage assemblies require a user to exert a downward force upon the assembly to engage a food item. This is dangerous, as a users hand may slip off the assembly and across the slicing blade, causing injury. In contrast, the carriage assembly 28 of the mandoline slicer 10 of the present invention does not require a user to exert a downward force with his or her hand but instead simply requires a user to press pushbuttons 104 inward to actuate the press plate 106, thereby decreasing the likelihood that a user's hand will slip off the carriage assembly and into the slicing blade.

Figure 38:
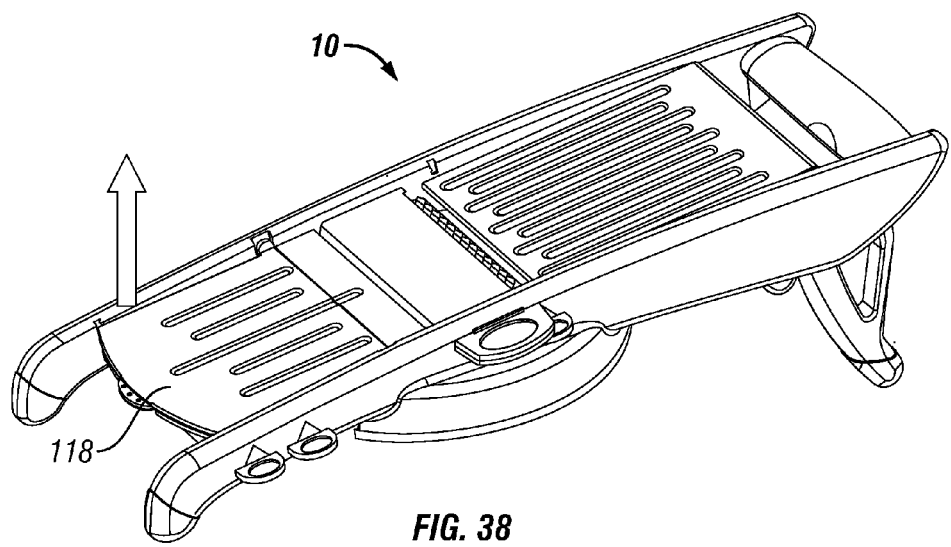
FIG. 38 is a perspective view of the mandoline slicer of FIG. 1 showing a safety cover in a retracted position.
Figure 39:
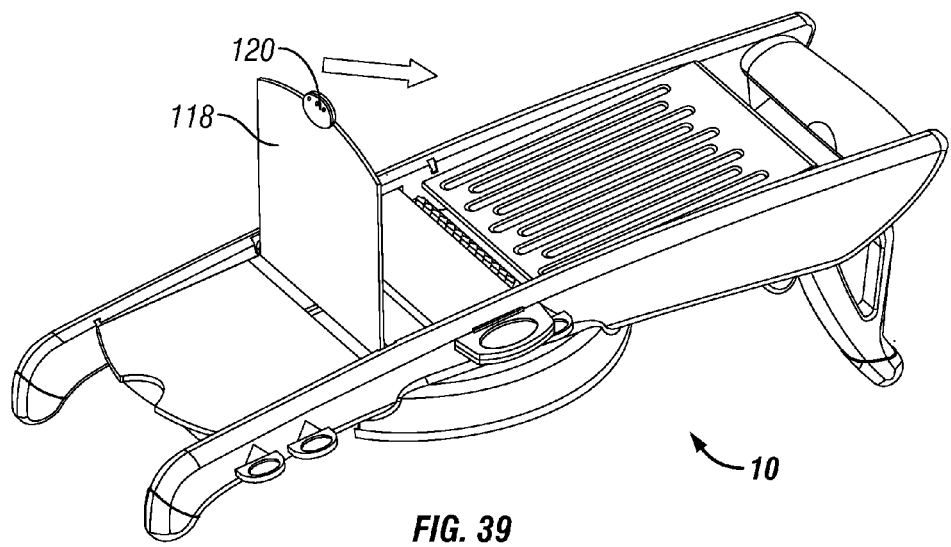
FIG. 39 is a perspective view of the mandoline slicer of FIG. 1 showing the safety cover in an intermediate position.
Figure 40:
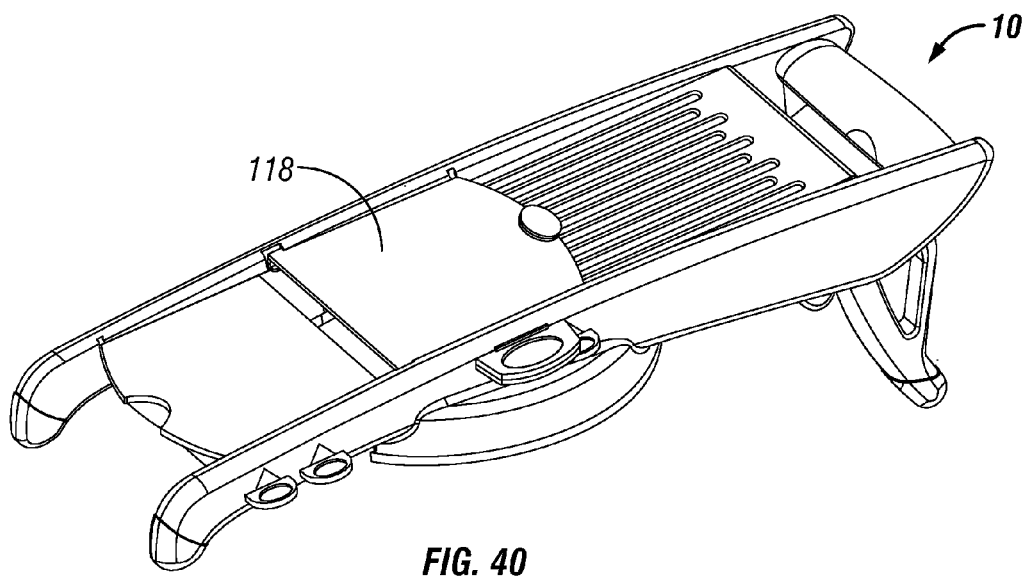
FIG. 40 is a perspective view of the mandoline slicer of FIG. 1 showing the safety cover in an engaged position.

As shown in FIGS. 28-40 the mandoline slicer of the present invention may also include a safety cover 118. The safety cover 118 is pivotally attached to the frame 12 at an inner surface of the sidewalls 14,16 adjacent the slicing blade 22 and is dimensioned to fit between the sidewalls 14,16 downstream from the slicing blade 22. The safety cover 118 is shown in an open, cutting position in FIG. 38. As shown therein, the cover 116 has a plurality of generally longitudinal and spaced apart ribs on one surface thereof. To activate the safety cover 116, a user grips protrusion 120 on the safety cover 118 and rotates the safety cover in the direction of the arrows such that the safety cover 116 blocks the slicing blade 22 and cutting knives 24,25, as shown in FIG. 40. As will be readily appreciated, the safety cover 116 provides added protection against injury when the slicer 10 is not in use.

Figure 41:
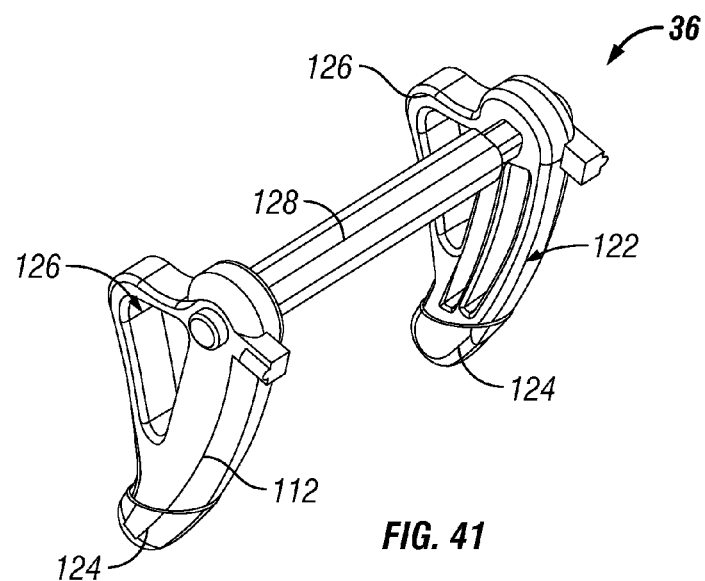
FIG. 41 is a perspective view of a leg assembly of the mandoline slicer of FIG. 1.
Figure 42:
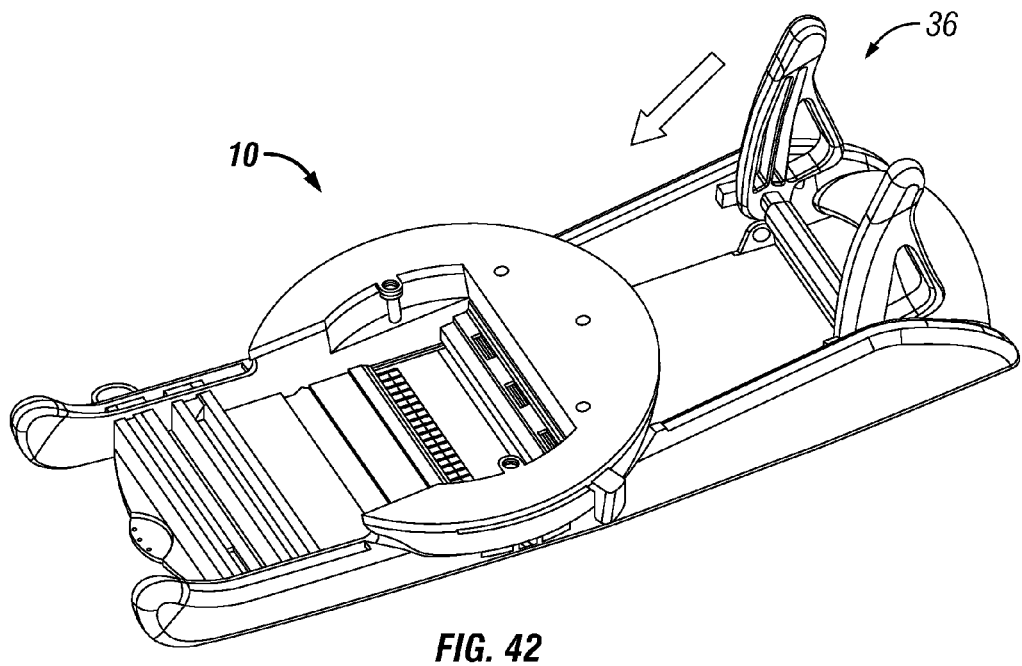
FIG. 42 is a perspective view of the mandoline slicer of FIG. 1 showing the leg assembly in an extended position.
Figure 43:
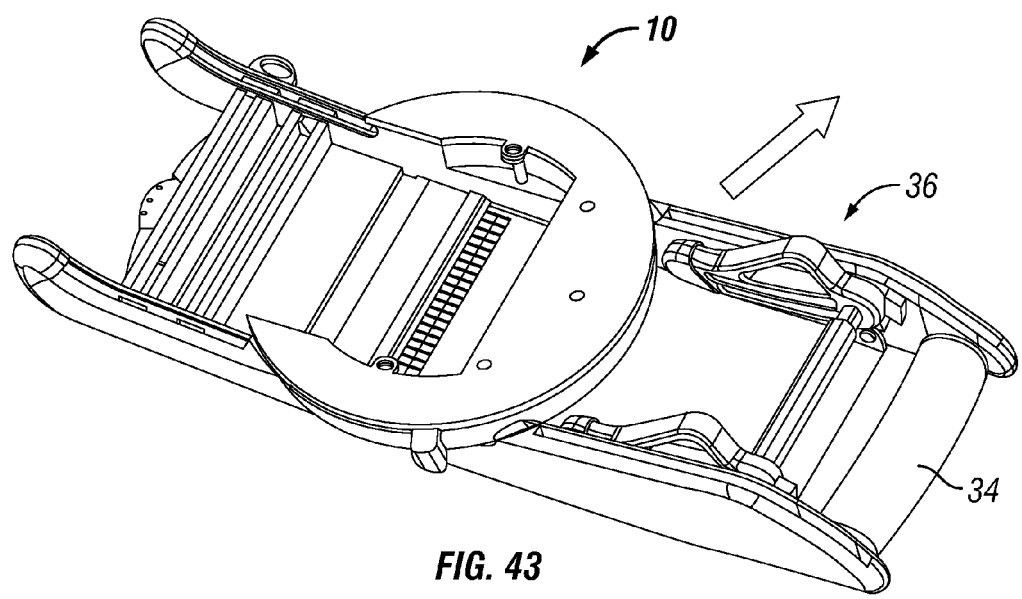
FIG. 43 is a perspective view of the mandoline slicer of FIG. 1 showing the leg assembly in storage position.

With reference to FIGS. 41-43 the rear leg assembly 36 of the mandoline slicer 10 is shown. The leg assembly 36 includes a pair of leg members 122 having feet 124 substantially similar to feet 34. The leg members 36 are integrally formed with a hook portion 126 to facilitate easy activation and are fixedly mounted on opposing ends of an axle 128. As shown in FIGS. 41 and 42, the leg assembly 36 is pivotally attached to the frame 12 at an inner surface of the sidewalls 14,16 underneath the infeed plate 18 and adjacent the handle 32. The leg assembly 36 is rotatable from the open position shown in FIG. 42, to the stowed position shown in FIG. 43 wherein the leg assembly 36 is folded into a recess in the frame. In order to open the leg assembly 36, a user must simply grab hook portion 126 and pull in the direction of the arrow shown in FIG. 43.

While the preferred embodiment of the present invention has been disclosed herein, it is understood that various modifications can be made without departing from the scope of the presently claimed invention.

What is claimed is:

1. A mandoline slicer, comprising:
a frame having opposed sidewalls;
a first support plate and a second support plate, said first and second support plates positioned between said opposed sidewalls;
a slicing member between said first and said second support plates, said slicing member having a slicing edge; and
a slice thickness adjustment mechanism having a lever movable between a first position and a second position and configured to vary a vertical distance between said slicing edge of said slicing member and an edge of said first support plate, said vertical distance being infinitely adjustable between a maximum distance and a minimum distance corresponding to said first position and said second position of said lever;
wherein said slice thickness adjustment mechanism further includes a semiannular inner gear operatively connected to said lever, and at least one screw member threadedly engaged in a threaded throughbore disposed in said frame and having a threaded body portion and a gear head portion; and
wherein said gear head portion of said screw member meshes with said inner gear.

2. The mandoline slicer of claim 1, wherein:
said first support plate is pivotally mounted to said frame; and
wherein when said lever is moved from said first position to said second position, said inner gear causes said screw member to advance in said throughbore and exert a force on an underside of said first support plate to pivotally move said first support plate relative to said frame.

3. The mandoline slicer of claim 1, wherein:
said at least one screw member is two screw members.

4. A mandoline slicer, comprising:
a frame having opposed sidewalls;
a first support plate and a second support plate, said first and second support plates positioned between said opposed sidewalls, said first support plate being pivotally mounted to said frame;
a slicing member between said first and said second support plates, said slicing member having a slicing edge; and
a slice thickness adjustment mechanism configured to vary a vertical distance between said slicing edge of said slicing member and an edge of said first support plate and having a lever movable between a first position and a second position, a semiannular inner gear operatively connected to said lever, and at least one screw member, said at least one screw member having a threaded body portion threadedly engaged in a throughbore in said frame and a gear head portion meshed with said inner gear;
wherein when said lever is moved from said first position to said second position, said inner gear causes said screw member to advance in said throughbore and exert a force on an underside of said first support plate to pivotally move said first support plate relative to said frame to vary said vertical distance.

* * * * *